(12) United States Patent
Vira et al.

(10) Patent No.: US 11,461,398 B2
(45) Date of Patent: Oct. 4, 2022

(54) INFORMATION PLATFORM FOR A VIRTUAL ASSISTANT

(71) Applicant: Accenture Global Solutions Limited, Dublin (IE)

(72) Inventors: Ashok Vira, Mumbai (IN); Raghavan Iyer, Bangalore (IN); Sangita Agarwal, Bangalore (IN); N. R. Srikanth, Bengaluru (IN); Chellappan Murugappan, Chennai (IN); Swetha Kommaraju, Hyderabad (IN); Sankara Narayanan, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 475 days.

(21) Appl. No.: 16/538,401

(22) Filed: Aug. 12, 2019

(65) Prior Publication Data
US 2020/0073895 A1 Mar. 5, 2020

(30) Foreign Application Priority Data
Aug. 31, 2018 (IN) .............................. 201841032762

(51) Int. Cl.
| | |
|---|---|
| G06F 16/9032 | (2019.01) |
| G06N 20/00 | (2019.01) |
| G06F 16/906 | (2019.01) |
| G06F 16/9038 | (2019.01) |
| G06N 5/04 | (2006.01) |
| G06N 3/00 | (2006.01) |

(52) U.S. Cl.
CPC ...... *G06F 16/90332* (2019.01); *G06F 16/906* (2019.01); *G06F 16/9038* (2019.01); *G06N 5/04* (2013.01); *G06N 20/00* (2019.01); *G06N 3/004* (2013.01)

(58) Field of Classification Search
None
See application file for complete search history.

(56) References Cited

U.S. PATENT DOCUMENTS

| | | | |
|---|---|---|---|
| 9,298,828 B1 * | 3/2016 | Das .................... | G06F 16/951 |
| 9,865,264 B2 | 1/2018 | Gelfenbeyn et al. | |
| 2012/0173665 A1 * | 7/2012 | Oh .................... | H04N 21/8352 |
| | | | 709/217 |

(Continued)

OTHER PUBLICATIONS

Kernighan B. W., "The C Programming Language Second Edition", Prentice Hall PTR, Englewood Cliffs, 1988, pp. 139-143.

*Primary Examiner* — Thu N Nguyen
(74) *Attorney, Agent, or Firm* — Harrity & Harrity, LLP

(57) ABSTRACT

A device may receive a query from a user device, and may process the query using a machine learning model to determine categories related to the query. The device may send a message, instructing a user to select a category, to the user device to cause the user device to display the message. The device may receive, from the user device, a selection related to the categories, and may call, based on the selection, a module to cause the module to process the query. The device may receive from the module a response to the query, and may send the response to the user device, to cause the user device to display the response. The device may send the query, the selection, and the response to one or more servers for storage, and may retrain the machine learning model based on information stored by the one or more servers.

17 Claims, 10 Drawing Sheets

(56) References Cited

U.S. PATENT DOCUMENTS

| | | |
|---|---|---|
| 2015/0255066 A1* | 9/2015 | Wilder .................. G10L 15/26 704/235 |
| 2016/0162555 A1* | 6/2016 | Shapira ................ G06F 3/0482 707/722 |
| 2017/0098012 A1* | 4/2017 | Zhu .................. G06F 16/24578 |
| 2018/0061400 A1 | 3/2018 | Carbune et al. |
| 2018/0131645 A1 | 5/2018 | Magliozzi et al. |
| 2018/0212904 A1 | 7/2018 | Smullen et al. |

\* cited by examiner

102: A user device sends a first query to an information platform

104: The information platform preprocesses the first query (e.g., reformats the first query)

106: The information platform calls a first module (e.g., the parent module) to process the first query and identify a topic, category, and/or intent associated with the first query 108: The information platform obtains information about a user of the user device 110: The information platform sends a message to the user device for a user to select the category, topic, and/or intent associated with the first query 112: The user makes a selection and the user device sends the selection to the information platform 114: The information platform calls a second module (e.g., child module 1) based on the selection to process the first query and determine a first response 116: The information platform sends the first response to the user device 128: The information platform sends a feedback request message regarding the first response and/or the second response to the user device 130: The user provides feedback and the user device sends the feedback to the information platform 132: The information platform updates and/or retrains the first module (e.g., the parent module) based on the feedback

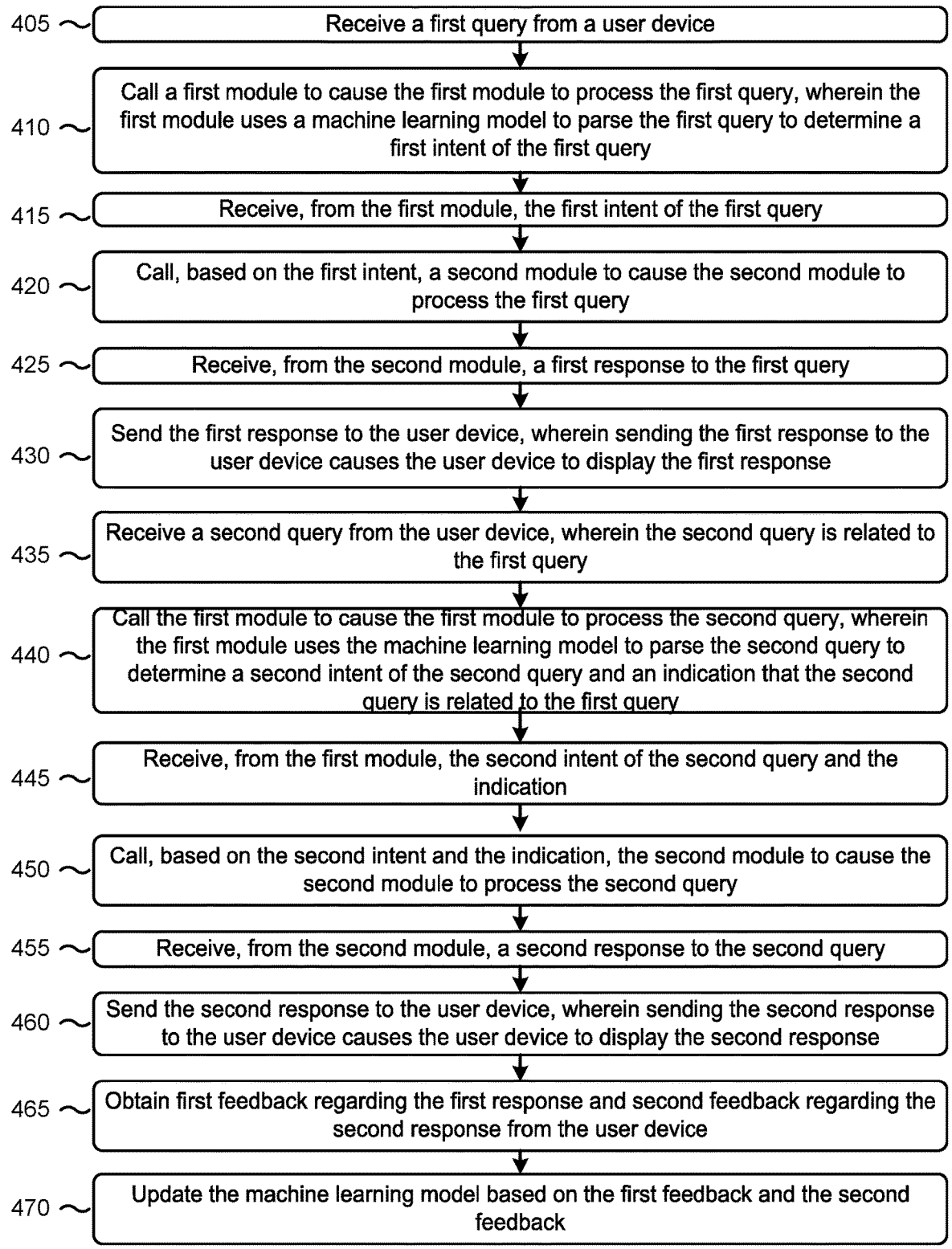

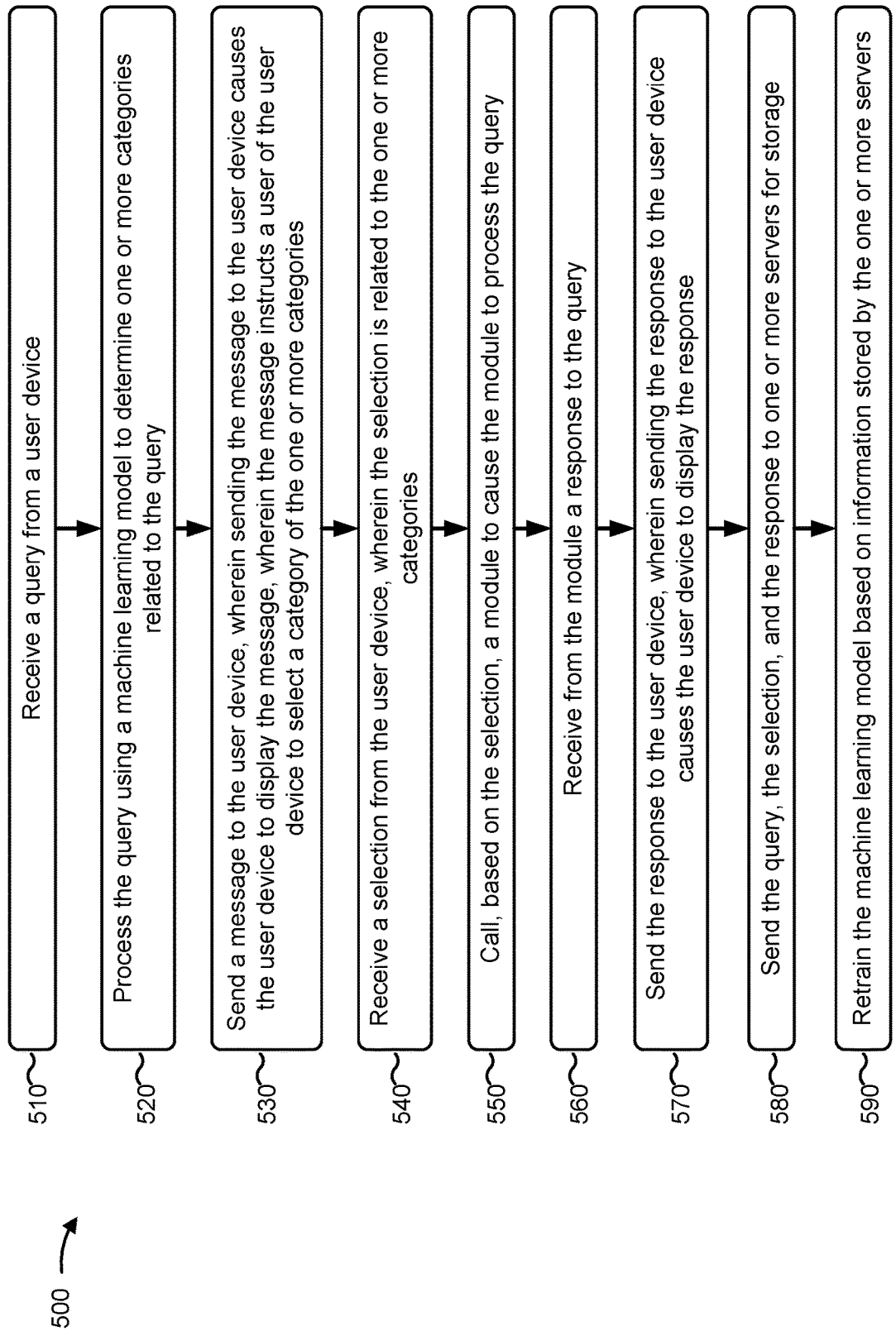

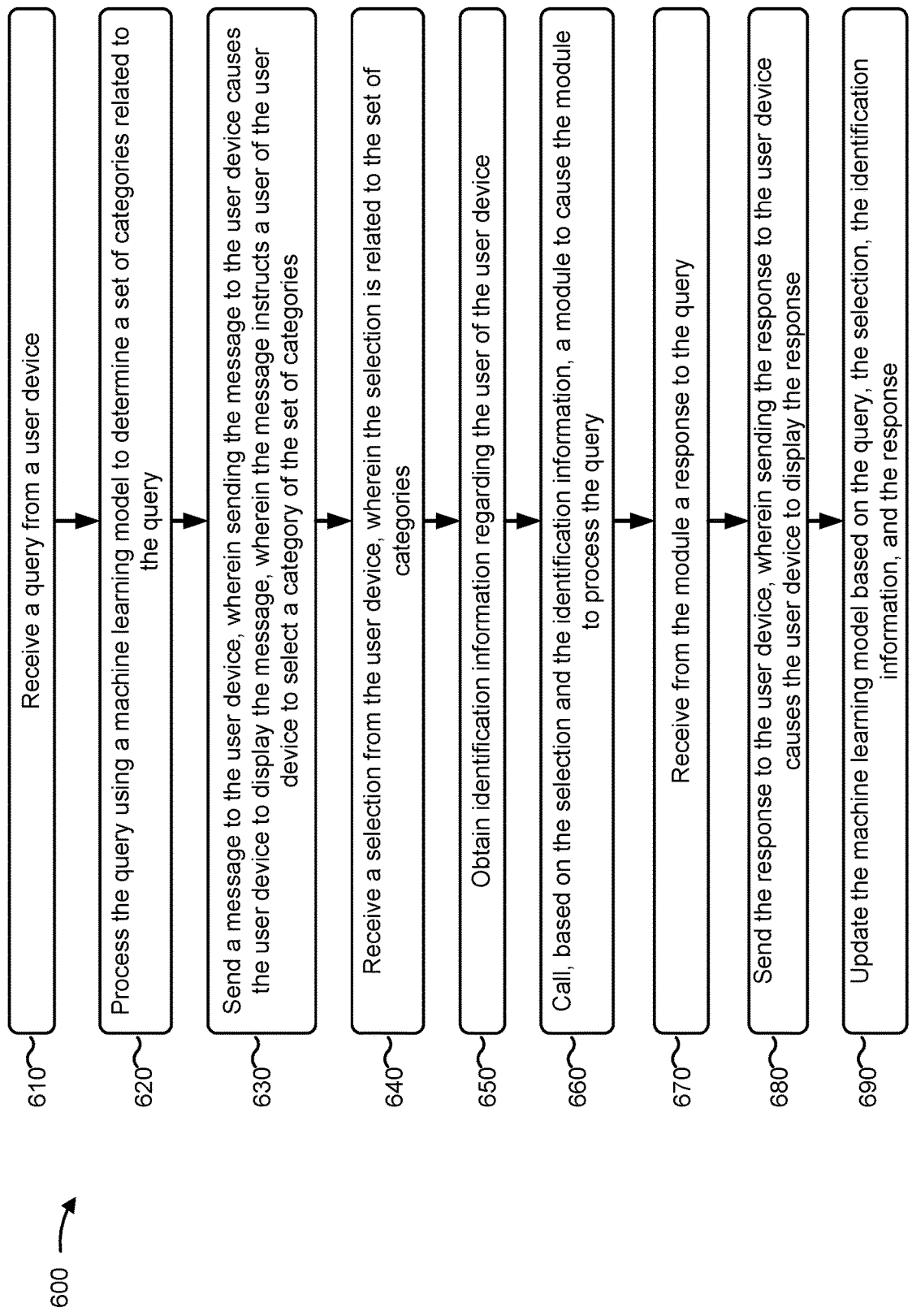

INFORMATION PLATFORM FOR A VIRTUAL ASSISTANT

RELATED APPLICATION

This application claims priority under 35 U.S.C. § 119 to Indian Patent Application No. 201841032762, filed on Aug. 31, 2018, the content of which is incorporated by reference herein in its entirety.

BACKGROUND

A virtual assistant (e.g., a chatbot, a talkbot, a chatterbot, a bot, or an artificial conversational entity) may include a computer program that converses with a human user via auditory or textual methods. In some cases, virtual assistants are designed to simulate how a human would behave as a conversational partner. A virtual assistant may be used in a dialog system for various practical purposes including customer service or information acquisition.

SUMMARY

According to some possible implementations, a device may include one or more memories, and one or more processors, communicatively coupled to the one or more memories, to receive a first query from a user device. The one or more processors may call a first module to cause the first module to process the first query, wherein the first module uses a machine learning model to parse the first query to determine a first intent of the first query. The one or more processors may receive, from the first module, the first intent of the first query, and may call, based on the first intent, a second module to cause the second module to process the first query. The one or more processors may receive, from the second module, a first response to the first query, and may send the first response to the user device, wherein sending the first response to the user device causes the user device to display the first response. The one or more processors may receive a second query from the user device, wherein the second query is related to the first query, and may call the first module to cause the first module to process the second query, wherein the first module uses the machine learning model to parse the second query to determine a second intent of the second query and an indication that the second query is related to the first query. The one or more processors may receive, from the first module, the second intent of the second query and the indication, and may call, based on the second intent and the indication, the second module to cause the second module to process the second query. The one or more processors may receive, from the second module, a second response to the second query, and may send the second response to the user device, wherein sending the second response to the user device causes the user device to display the second response. The one or more processors may obtain first feedback regarding the first response and second feedback regarding the second response from the user device, and may update the machine learning model based on the first feedback and the second feedback.

According to some possible implementations, a non-transitory computer-readable medium may store instructions that include one or more instructions that, when executed by one or more processors of a device, cause the one or more processors to receive a query from a user device, and to process the query using a machine learning model to determine one or more categories related to the query. The one or more instructions may cause the one or more processors to send a message to the user device, wherein sending the message to the user device causes the user device to display the message, and wherein the message instructs a user of the user device to select a category of the one or more categories. The one or more instructions may cause the one or more processors to receive a selection from the user device, wherein the selection is related to the one or more categories, and to call, based on the selection, a module to cause the module to process the query. The one or more instructions may cause the one or more processors to receive from the module a response to the query, and to send the response to the user device, wherein sending the response to the user device causes the user device to display the response. The one or more instructions may cause the one or more processors to send the query, the selection, and the response to one or more servers for storage, and to retrain the machine learning model based on information stored by the one or more servers.

According to some possible implementations, a method may include receiving, by a device, a query from a user device, and processing, by the device, the query using a machine learning model to determine a set of categories related to the query. The method may include sending, by the device, a message to the user device, wherein sending the message to the user device causes the user device to display the message, and wherein the message instructs a user of the user device to select a category of the set of categories. The method may include receiving, by the device, a selection from the user device, wherein the selection is related to the set of categories, and obtaining, by the device, identification information regarding the user of the user device. The method may include calling, by the device and based on the selection and the identification information, a module to cause the module to process the query. The method may include receiving, by the device, and from the module, a response to the query. The method may include sending, by the device, the response to the user device, wherein sending the response to the user device causes the user device to display the response, and updating the machine learning model based on the query, the selection, the identification information, and the response.

BRIEF DESCRIPTION OF THE DRAWINGS

FIG. 4 is a flow chart of an example process for an information platform for a virtual assistant.

FIG. 5 is a flow chart of an example process for an information platform for a virtual assistant.

FIG. 6 is a flow chart of an example process for an information platform for a virtual assistant.

DETAILED DESCRIPTION

Figure 1A:
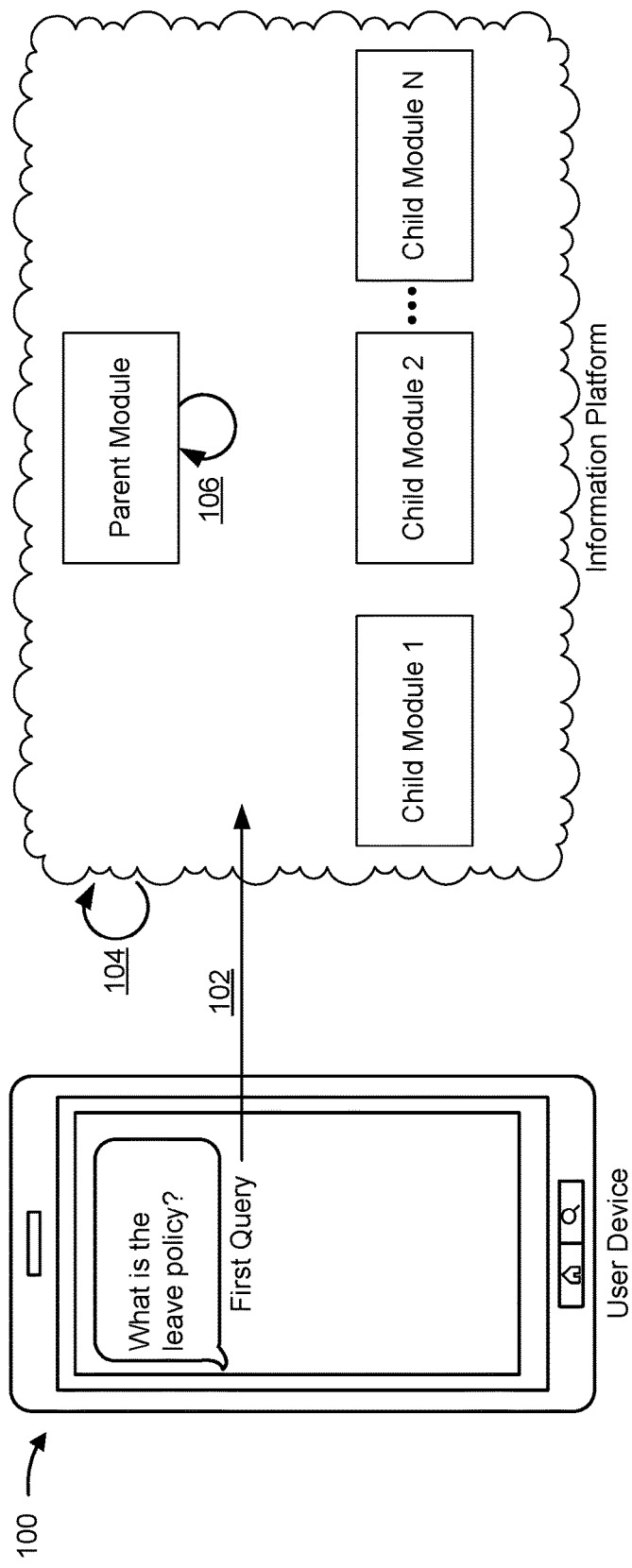
FIGS. 1A-1E are diagrams of example implementations described herein.

The following detailed description of example implementations refers to the accompanying drawings. The same reference numbers in different drawings may identify the same or similar elements.

An employee of a company may need information about the company's services, policies, practices, and/or the like.

Often, the information is hard to find, because the information is stored by various, different information resources, such as websites, intranet sites, databases, servers, offline sites, and/or the like. The process for finding the information may be even harder for a new employee who is not familiar with the location of company's information resources or how to access the information resources. Further, in many cases, the employee may need additional information than what a particular information resource can provide, so the employee must spend additional time searching for and scouring other information resources.

Some implementations, described herein, provide an information platform (e.g., a one-stop information resource) that facilitates a virtual assistant answering a user's queries. Some implementations provide an information platform that includes a module that uses a machine learning model to identify and/or determine one or more characteristics of a query received from a user device. According to some implementations, the module may send a message to a user device, where the message instructs a user of the user device to select a characteristic of the one or more characteristics. In some implementations, the information platform calls an additional module based on the one or more characteristics and/or a selection of the user for the additional module to process the query and determine a response. According to some implementations, the information platform may send (e.g., via the virtual assistant) the response to the user device. In some implementations, the information platform may receive an additional query that is related to the query and orchestrate a similar process to provide an additional response to the user device. According to some implementations, the information platform may receive feedback regarding the responses from the user device and update and/or retrain the machine learning model based on the feedback. In this way, the information platform provides a computer-based system to intelligently respond to a user's queries (e.g., via the virtual assistant), thereby improving the quality of the information that the user receives and reducing the amount of time the user has to spend to obtain the information.

Several different stages of a process for using a machine learning model to categorize a query, responding to a query, and updating the machine learning model are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or activities that were not previously performed or were previously performed using subjective human intuition or input. For example, currently there does not exist a technique to automatically update and/or retrain a machine learning model to categorize a query to improve interactions with a virtual assistant. Accordingly, computing resources associated with a human actor creating training sets and/or the like and supervising an updating and/or retraining a process for a machine learning model, as described herein, can be conserved. Finally, automating the process for categorizing the query, as described herein, conserves computing resources (e.g., processor resources, memory resources, and/or the like) that would otherwise be wasted by a user analyzing queries.

FIGS. 1A-1E are diagrams of example implementations 100 described herein. Example implementation 100 may include a user device (e.g., a personal computing device, such as a smartphone, laptop, desktop computer, tablet, and/or the like) and an information platform (e.g., a system that provides information to a user, such as via a virtual assistant, a chat bot, and/or the like). In some implementations, the user device and the information platform may be connected via a network, such as the Internet, an intranet, and/or the like.

As shown in FIG. 1A, and by reference number 102, a user device may send a query (e.g., a first query) to an information platform (e.g., via the virtual assistant). In some implementations, a user of the user device may enter the first query into the user device via a user interface, such as user interface provided by a virtual assistant application. For example, the user may enter the first query using a messaging platform, such as email, text messaging (e.g., a short message service (SMS) and/or the like), a messaging application, and/or the like. In some implementations, the first query may be associated with a topic, a category, an intent, and/or the like. For example, a user who is an employee of a company may ask a question regarding the company's Human Resources (HR) policies, the company's travel policies, the company's payment and/or reimbursement policies, and/or the like. In some implementations, the information platform may receive the first query from the user device via the network. When receiving the first query, the information platform may receive hundreds, thousand, millions, etc. of data elements associated with hundreds, thousands, millions, etc. of queries. In this way, the information platform may receive a data set that cannot be processed manually or objectively by human operators.

As shown by reference number 104, the information platform preprocesses the first query after receiving the first query. In some implementations, the information platform may preprocess the first query by reformatting the first query, such as by removing capitalization, punctuation, and/or the like. In some implementations, the information platform may preprocess the first query by performing an action on the first query, such as performing a spell check and/or a spell correction action and/or a grammar check and/or a grammar correction action on the first query, translating the first query from one language to another language, performing a sentiment analysis of the first query, and/or the like. For example, the information platform may perform a sentiment analysis of the first query to categorize the first query as a positive utterance, a neutral utterance, a negative utterance, and/or the like. In some implementations, the information platform may call a module (e.g., a child module) to cause the module to preprocess the first query.

As shown by reference number 106, the information platform processes the first query. In some implementations, the information platform may call a first module (e.g., the parent module) to cause the first module to process the first query. In some implementations, the first module may process the first query to determine and/or identify one or more characteristics, such as one or more topics, one or more categories, one or more intents, and/or the like associated with the first query. For example, the first module may parse the first query to determine one or more HR categories associated with the first query. In some implementations, the first module may return the one or more characteristics to the information platform. In some implementations, the information platform may receive the one or more characteristics from the first module.

In some implementations, the first module may use natural language processing to process the first query. In some implementations, the first module may use a natural language machine learning service, such as Microsoft's Language Understanding Intelligent Service (LUIS), IBM's Watson Assistant service, and/or the like, to process the first query. In some implementations, the first module may use one or more artificial intelligence techniques, such as machine learning, deep learning, and/or the like to process the first query to determine and/or identify the one or more characteristics and one or more confidence scores, wherein a particular characteristic of the one or more characteristics is associated with a particular confidence score (e.g., a characteristic confidence score, such as a topic confidence score, a category confidence score, an intent confidence score, and/or the like that indicates a likelihood that the characteristic correctly categorizes the first query) of the one or more confidence scores.

In some implementations, the first module may determine the one or more characteristics of the first query based on natural language processing of the first query. For example, based on the first query being "When is the next holiday?" (e.g., asked by the user via the virtual assistant on the user device), the first module may use natural language processing to determine that a characteristic of the first query is that the first query is associated with a company holiday policy. Similarly, as shown in FIG. 1A, based on the first query being "What is the leave policy?" (e.g., asked by the user via the virtual assistant on the user device), the first module may use natural language processing to determine that one or more characteristics of the first query is that the first query is associated with a company vacation leave policy, a company sick leave policy, a company family leave policy, and/or the like. In this case, the first module may determine that a natural language text corresponds to one or more characteristics.

In this way, the first module may determine and/or identify the one or more characteristics of the first query based on elements (e.g., word use, word formatting, sentence structure, and/or the like) of the first query, as described herein. Based on applying a rigorous and automated process associated with determining and/or identifying the one or more characteristics of the first query, the first module enables determination and/or identification of thousands or millions of characteristics for thousands or millions of queries, thereby increasing an accuracy and consistency of characteristic determination and/or identification relative to requiring computing resources to be allocated for hundreds or thousands of technicians to manually determine and/or identify the characteristics of the thousands or millions of queries.

In some implementations, the first module may determine one or more confidence scores associated with the one or more characteristics, as described herein. For example, the first module may determine a confidence score for a characteristic based on the characteristic and the first query. In this case, the first module may generate a model of confidence score determination. For example, the first module may train a model using information that includes a plurality of characteristics, a plurality of queries, and/or the like, to determine a likelihood that a characteristic correctly categorizes a query. As an example, the first module may determine that past queries are associated with a threshold probability of being associated with a characteristic. In this case, the first module may determine that a relatively high confidence score (e.g., as being likely to be determined) is to be assigned to characteristics that are determined to be the same or similar as previously identified characteristics. In contrast, the first module may determine that a relatively low confidence score (e.g., as being unlikely to be determined) is to be assigned to characteristics that are determined to be different than past identified characteristics.

In some implementations, the first module may perform a preprocessing operation when generating the model of confidence score determination. For example, the first module may preprocess the queries to remove non-ASCII characters, white spaces, confidential data (e.g., sensitive information, such as personal information, health information, and/or the like). In this way, the first module may organize thousands, millions, or billions of queries for machine learning and model generation—a data set that cannot be processed objectively by a human actor.

In some implementations, the first module may perform a training operation when generating the model of confidence score determination. For example, the first module may portion the queries, characteristics, and/or the like into a training set, a validation set, a test set, and/or the like. In some implementations, the first module may train the model of confidence score determination using, for example, an unsupervised training procedure based on the training set of the data. For example, the first module may perform dimensionality reduction to reduce the data to a minimum feature set, thereby reducing processing to train the model of confidence score determination, and may apply a classification technique, to the minimum feature set.

In some implementations, the first module may use a logistic regression classification technique to determine a categorical outcome (e.g., that a characteristic has a high confidence score, that a characteristic has a low confidence score, and/or the like). Additionally, or alternatively, the first module may use a naïve Bayesian classifier technique. In this case, the first module may perform binary recursive partitioning to split the data of the minimum feature set into partitions and/or branches and use the partitions and/or branches to perform predictions (e.g., that that a characteristic has a high confidence score, that a characteristic has a low confidence score, and/or the like). Based on using recursive partitioning, the first module may reduce utilization of computing resources relative to manual, linear sorting and analysis of data points, thereby enabling use of thousands, millions, or billions of data points to train a model, which may result in a more accurate model than using fewer data points.

Additionally, or alternatively, the first module may use a support vector machine (SVM) classifier technique to generate a non-linear boundary between data points in the training set. In this case, the non-linear boundary is used to classify test data (e.g., data relating to an identified characteristic of a query) into a particular class (e.g., a class indicating that the characteristic has a high confidence score), a class indicating that the characteristic has a low confidence score, and/or the like).

Additionally, or alternatively, the first module may train the model of confidence score determination using a supervised training procedure that includes receiving input to the model from a subject matter expert, which may reduce an amount of time, an amount of processing resources, and/or the like to train the model of confidence score determination relative to an unsupervised training procedure. In some implementations, the first module may use one or more other model training techniques, such as a neural network technique, a latent semantic indexing technique, and/or the like. For example, the first module may perform an artificial neural network processing technique (e.g., using a two-layer feedforward neural network architecture, a three-layer feedforward neural network architecture, and/or the like) to perform pattern recognition with regard to patterns of whether queries described using different semantic descriptions can be categorized with a characteristic or not. In this case, using the artificial neural network processing technique may improve an accuracy of a model (e.g., the confidence score determination) generated by the first module by being more robust to noisy, imprecise, or incomplete data, and by enabling the first module to detect patterns and/or trends undetectable to human analysts or systems using less complex techniques.

Accordingly, the first module may use any number of artificial intelligence techniques, machine learning techniques, deep learning techniques, and/or the like to determine and/or identify one or more characteristics and/or the one or more corresponding confidence scores related to the first query.

In some implementations, the information platform may select a set of characteristics of the one or more characteristics based on the respective confidence scores of the one or more characteristics. In some implementations, the information platform may determine, for particular characteristics, that the corresponding confidence scores satisfy a threshold. The information platform may select the set of characteristics based on the corresponding confidence scores satisfying the threshold. For example, the information platform may select the set of characteristics that have corresponding confidence scores above a certain level, such as a 40% likelihood that a characteristic correctly categorizes the query. In some implementations, the information platform may select the set of characteristics based on a difference between the corresponding confidence scores satisfying an additional threshold. For example, the information platform may select the set of characteristics, where the difference (e.g., mathematical subtraction) between the corresponding confidence scores of the set of characteristics is below a certain level, such as a 10% difference. In some implementations, the information platform may select the set of characteristics that have corresponding confidence scores that satisfy one or more criteria. For example, the information platform may select a particular number of characteristics with the highest corresponding confidence scores (e.g., the four characteristics with the highest corresponding confidence scores).

Figure 1B:
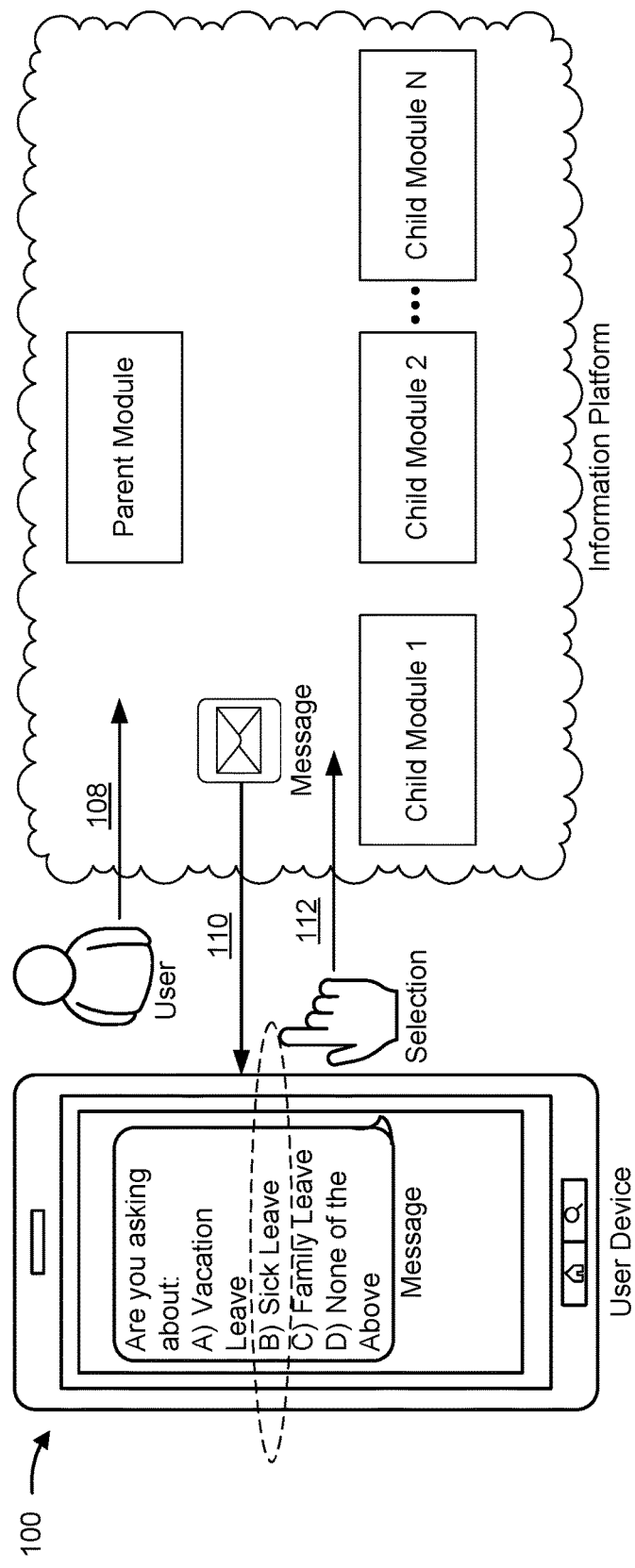

As shown in FIG. 1B, and by reference number 108, the information platform obtains identification information about a user of the user device. In some implementations, the information platform may obtain information about the user based on an identifier of the user device (e.g., a serial number associated with the user device, a registration identifier associated with the user device, an Internet Protocol (IP) address of the user device, and/or the like). For example, the information platform may use the identifier to search a lookup table that associates the identifier and the identification information. In some implementations, the user may enter identification credentials (e.g., a username, an employee identifier, a password, and/or the like) into the user device (e.g., via a virtual assistant application executing on the user device) and the user device may send the identification credentials to the information platform. The information platform may call a module using the identification credentials to lookup the identification information. In some implementations, the identification information indicates a location of the user (e.g., where the user is currently located, where the user works, where the user lives, where the user travels to, and/or the like), a membership of the user (e.g., what team a user belongs to, what affinity groups a user associates with, what part of a company a user works in, and/or the like), an employee identifier of the user (e.g., an employment identification number, a security level of the user, and/or the like), a job title of the user, a job role of the user, a status of the user (e.g., a marital status, an employment status, a health status, and/or the like), and/or the like.

In some implementations, as shown by reference number 110, the information platform may send a message to the user device for a user to select a characteristic, such as a category, a topic, and/or an intent, associated with the first query. In some implementations, the information platform may send the message (e.g., via the virtual assistant) to the user device, which may cause the user device to display the message. The message may instruct the user of the user device to select a characteristic of the one or more characteristics, the set of characteristics, and/or the like. In some implementations, the information platform may send the message if no characteristic of the one or more characteristics, the set of characteristics, and/or the like has a corresponding confidence score that satisfies a threshold. For example, the information platform may send the message if no characteristic of the set of characteristics has a confidence score above a certain level, such as a 90% likelihood that a characteristic correctly categorizes the first query. Additionally, or alternatively, the information platform may not send the message if a characteristic of the one or more characteristics, the set of characteristics, and/or the like has a corresponding confidence score that satisfies a threshold. For example, the information platform may not send the message if a characteristic of the one or more characteristics has a confidence score above a certain level, such as a 95% likelihood that a characteristic correctly categorizes the first query.

As shown by reference number 112, the user makes a selection (e.g., via the virtual assistant) and the user device sends the selection to the information platform. In some implementations, the selection is related to the set of characteristics, the one or more characteristics, and/or the like. In some implementations, the user does not make a selection if the information platform does not send the message to the user device. In some implementations, the information platform receives the selection from the user device via the network.

Figure 1C:
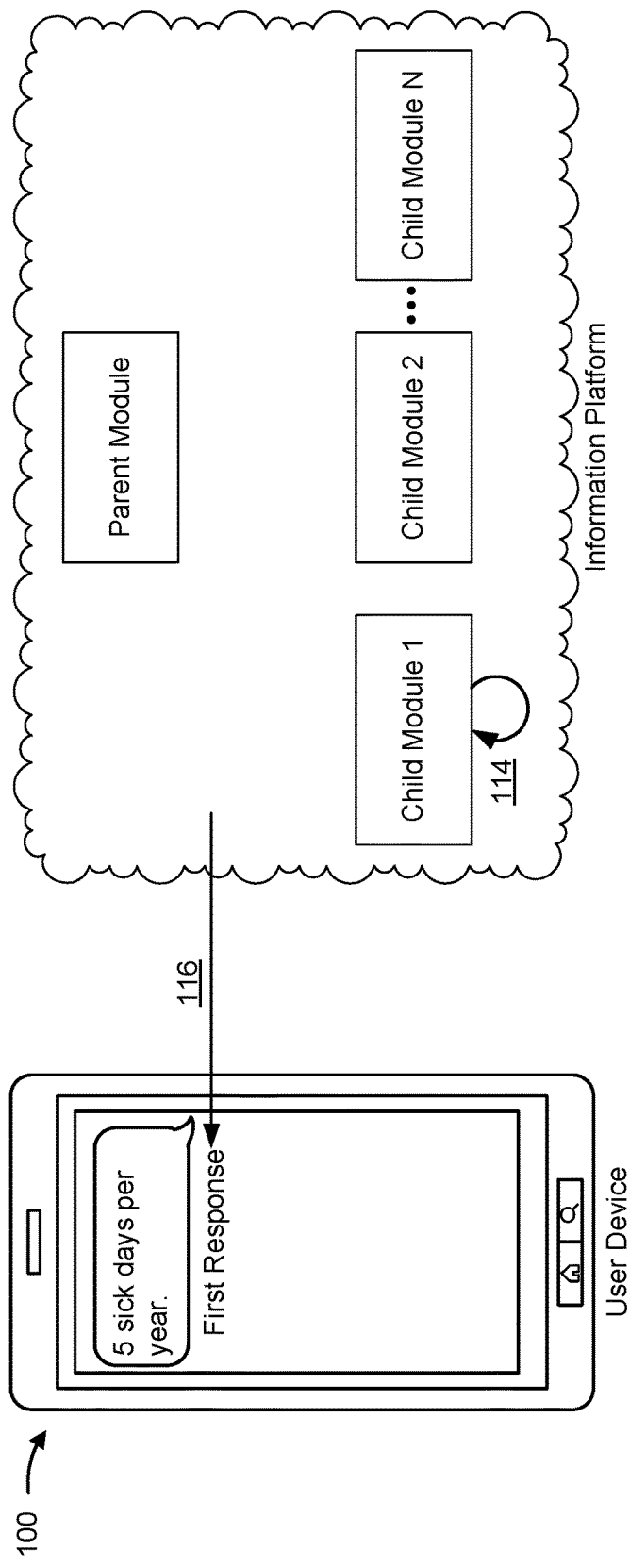

As shown in FIG. 1C, and by reference number 114, the information platform processes the first query. In some implementations, the information platform may call a second module (e.g., child module 1) to cause the second module to process the first query. In some implementations, the information platform may call the second module based on the one or more characteristics to cause the second module to process the first query. For example, based on a query being "When is the next holiday?", the information platform may call a module that processes holiday queries or generic (non-user specific) queries. In some implementations, the information platform may call the second module based on the selection and/or the identification information to cause the second module to process the first query. In some implementations, the information platform may determine a set of modules from a plurality of modules (e.g., one or more modules that include less than all the modules of the plurality of modules) based on the identification information and select the second module from the set of modules based on the selection. For example, based on a query being "What is the leave policy?", the information platform may determine a plurality of "leave" modules that are relevant to the user as a citizen of a particular country (e.g., the identification information indicates that the user is a citizen of India, the United States, Mexico, and/or the like) and call a country-specific "leave" module that corresponds to the user's selection, such as the "sick leave" selection shown in FIG. 1B. In some implementations, the information platform may establish a connection with the second module via an application programming interface (API). In some implementations, the information platform may establish the connection with the second module via the API based on the identification information (e.g., connect via an intranet connection if the user is on the company network, connect via the Internet if the user is not on the company network, and/or the like).

In some implementations, the second module may access a universal knowledge base to process the first query. For example, the second module may access a standardized knowledge base, such as a frequently-asked-questions (FAQ) database (e.g., a Microsoft QNA maker database), an employee manuals database, and/or the like to process the first query. In some implementations, the second module may access a personalized knowledge base to process the first query. For example, the second module may access a knowledge base that is specific to the user, such as a pay records database, a health records database, and/or the like. In some implementations, the second module may access a static data structure to process the first query. For example, the second module may access a data structure that does not frequently change and/or update, such as a holiday data structure, an employees' legal rights data structure, and/or the like. In some implementations, the second module may access a dynamic data structure to process the first query. For example, the second module may access a data structure that frequently changes and/or updates, such as a company organization data structure, an employee accrued leave data structure, and/or the like. In some implementations, the second module may process the first query based on the identification information. For example, the second module may process the "What is my balance?" query shown in FIG. 1D based on the user's employee identification number contained in the identifier to determine the user's balance of sick days left for the year.

In some implementations, the second module may determine a response. For example, the second module may use natural language processing to process the first query and look up information in a data structure, a knowledge base, and/or the like to determine the response (e.g., a first response). In some implementations, the second module may determine and/or identify one or more questions related to the first query by accessing the data structure, a knowledge base, and/or the like. In some implementations, the second module may send an additional message to the user device for the user to select a question of the one or more questions related to the first query. In some implementations, the user makes an additional selection and the user device sends the additional selection to the information platform. In some implementations, the additional selection identifies a question of the one or more questions. In some implementations, the second module processes the additional selection to determine the first response. In some implementations, the second module may return the first response to the information platform. In some implementations, the information platform may receive the first response from the second module. In some implementations, the first response may include information related to the identification information. For example, the second module may return a response that includes the user's personal information.

As shown by reference number 116, the information platform sends the first response to the user device. In some implementations, sending the first response to the user device causes the user device to display the first response (e.g., via the virtual assistant).

Figure 1D:
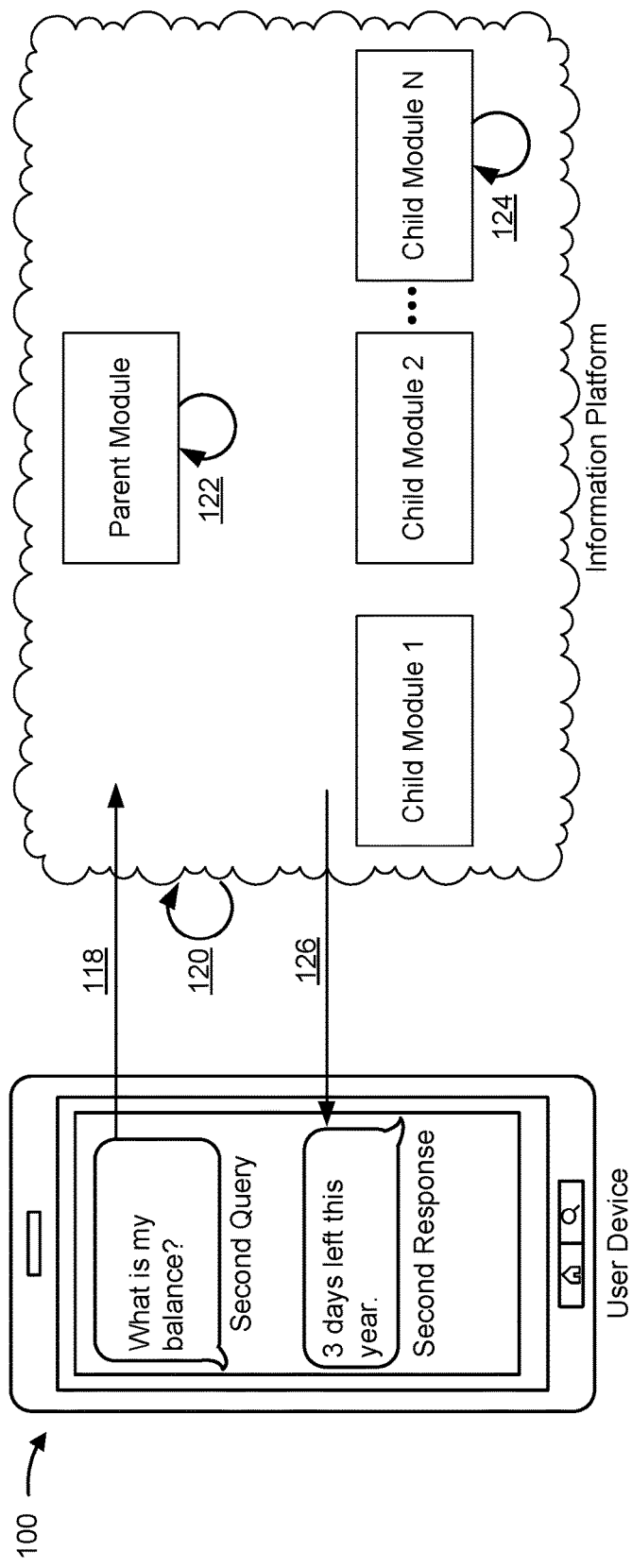

As shown in FIG. 1D, and by reference number 118, the user device sends an additional query (e.g., a second query) to the information platform in a similar manner as described herein in relation to FIG. 1A. In some implementations, the information platform may receive the second query from the user device via the network. In some implementations, the second query is related to the first query. For example, as shown in FIG. 1D, the second query "What is my balance?" is a related follow-up question to the first query "What is the leave policy?" (shown in FIG. 1A). In some implementations, the second query is not related to the first query. For example, the second query may be "How do I change my last working day," which concerns exiting the company, and is not related to the first query "What is the leave policy?" (shown in FIG. 1A).

As shown by reference number 120, the information platform preprocesses the second query in a similar manner as described herein in relation to FIG. 1A. As shown by reference number 122, the information platform processes the second query in a similar manner as described herein in relation to FIG. 1A. For example, the information platform may call the first module (e.g., the parent module) to process the second query and determine and/or identify one or more characteristics, such as one or more topics, one or more categories, one or more intents, and/or the like associated with the second query. In some implementations, the first module may determine that the second query is related to the first query (e.g., based on the one or more characteristics of the second query being the same or similar as the one or more characteristics of the first query). In some implementations, the first module may determine that the second query is not related to the first query (e.g., based on the one or more characteristics of the second query not being the same or similar as the one or more characteristics of the first query). In some implementations, the information platform may receive, from the first module, the one or more characteristics of the second query and/or an indication that the second query is related to the first query.

In some implementations, the information platform may send a message to the user device for a user to select a characteristic of the one or more characteristics of the second query and the user device may send an additional selection (e.g., a second selection) to the information platform in a similar manner as described herein in relation to FIG. 1B. Additionally, or alternatively, as shown by reference number 124, the information platform calls a module to process the second query in a similar manner as described herein in relation to FIG. 1C. For example, the information platform may call a third module (e.g., child module N) to process the second query and determine a response to the second query (e.g., a second response). In some implementations, the information platform may receive the second response from the third module. As another example, where the second query is related to the first query, the information platform may call the second module (e.g., child module 1) to process the second query and determine a response to the second query (e.g., the second response) because the information platform called the second module to process the first query and determine the first response. As shown by reference number 126, the information platform sends the second response to the user device in a similar manner as described herein in relation to FIG. 1C. In some implementations, sending the second response to the user device may cause the user device to display the second response.

Figure 1E:
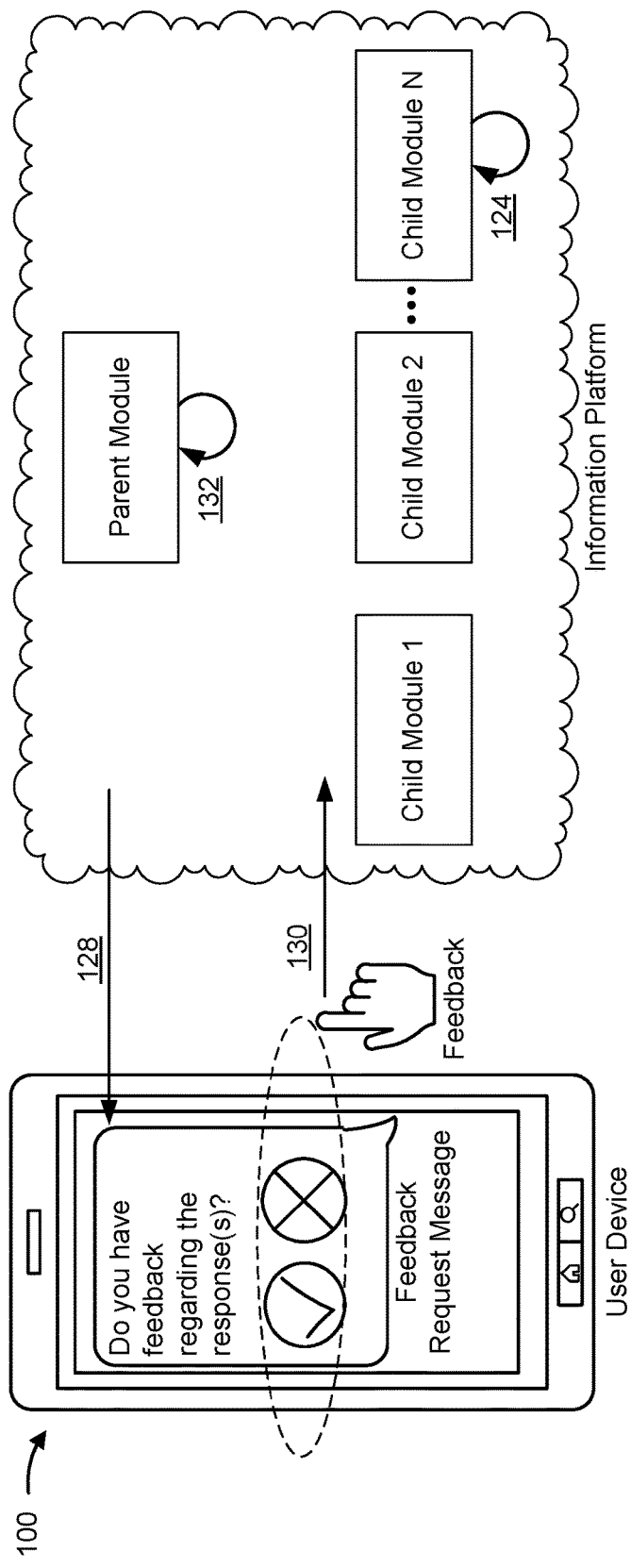

As shown in FIG. 1E, and by reference number 128, the information platform sends a feedback request message regarding the first response and/or the second response to the user device. For example, the information platform may send a message (e.g., a first message) to the user device soliciting an assessment (e.g., a first assessment) of the first response. In some implementations, the information platform sends the message after sending the first response. Additionally, or alternatively, the information platform may send an additional message (e.g., a second message) to the user device soliciting an additional assessment (e.g., a second assessment) of the second response. In some implementations, the information platform sends the message after sending the second response. In some implementations, sending the first message and/or the second message to the user device may cause the user device to display the first message and/or the second message.

As shown by reference number 130, the user provides feedback and the user device sends the feedback to the information platform. In some implementations, the user may provide, via the user device, feedback regarding the first response and/or the second response. For example, the user may provide feedback indicating that first response was "good" and/or that the second response was "poor." In some implementations, the user provides the feedback in response to the first message and/or second message. In some implementations, the user proactively provides the feedback after receiving the first response and/or the second response. For example, the user may select a "rate this response" button (e.g., available via the virtual assistant), where the user can enter a comment regarding the first response and/or the second response. In some implementations, the user device sends the feedback to the information platform and the information platform receives the feedback via the network.

As shown by reference number 132, the information platform updates and/or retrains the machine learning model used by the first module (e.g., the parent module) based on the feedback. For example, the information platform may update the machine learning model based on the first response receiving "good" feedback and the second response receiving "poor" feedback. In some implementations, the information platform sends the feedback to one or more servers for storage. In some implementations, the information platform sends additional information, such as the first query, the selection, the first response, the identification information, the second query, the additional selection, the second response, and/or the like to the one or more servers for storage. In some implementations, the information platform updates and/or retrains the machine learning model used by the first module, and described in relation to FIG. 1A, based on information stored by the one or more servers. For example, the information platform may call the first module to cause the first module to update the model of confidence score determination based on the information stored by the one or more servers, such as one or more of the first query, the selection, the first response, the identification information, the second query, the additional selection, the second response, and/or the like. The first module may update the model of confidence score determination to determine a confidence score for a characteristic based on the characteristic, the first query, the selection, the first response, the identification information, the second query, the additional selection, the second response, the feedback, and/or the like stored by the one or more servers in a similar manner as described in relation to FIG. 1A. In some implementations, the information platform may call the first module to cause the first module to update the model of confidence score determination based on the information stored by the one or more servers on a schedule (e.g., every hour, every day, every week, and/or the like). In some implementations, the information platform may call the first module to cause the first module to update the model of confidence score determination based on the information stored by the one or more servers on demand, such as when the information platform receives a threshold amount of negative feedback. In this way, the information platform can automatically improve the functionality, accuracy, efficiency, and/or the like of the machine learning module without any human intervention.

In some implementations, the information platform can assist a text virtual assistant, a voice virtual assistant, and/or the like. For example, the information platform can receive one or more text queries, process the one or more text queries, and provide responses to the one or more text queries in a similar manner as described in relation to FIGS. 1A-1E. As another example, the information platform can receive one or more voice queries, process the one or more voice queries (e.g., by using voice recognition processes to convert the voice query into text), and provide responses to the one or more text queries (e.g., by using text-to-speech processes to convert the response from text into audible speech) in a similar manner as described in relation to FIGS. 1A-1E. Moreover, the information platform can assist a text-voice virtual assistant (e.g., a virtual assistant that can handle a text query and a voice response), a voice-text virtual assistant (e.g., a virtual assistant that can handle a voice query and a text response), and/or the like.

As indicated above, FIGS. 1A-1E are provided merely as examples. Other examples are possible and may differ from what was described with regard to FIGS. 1A-1E.

Figure 2:
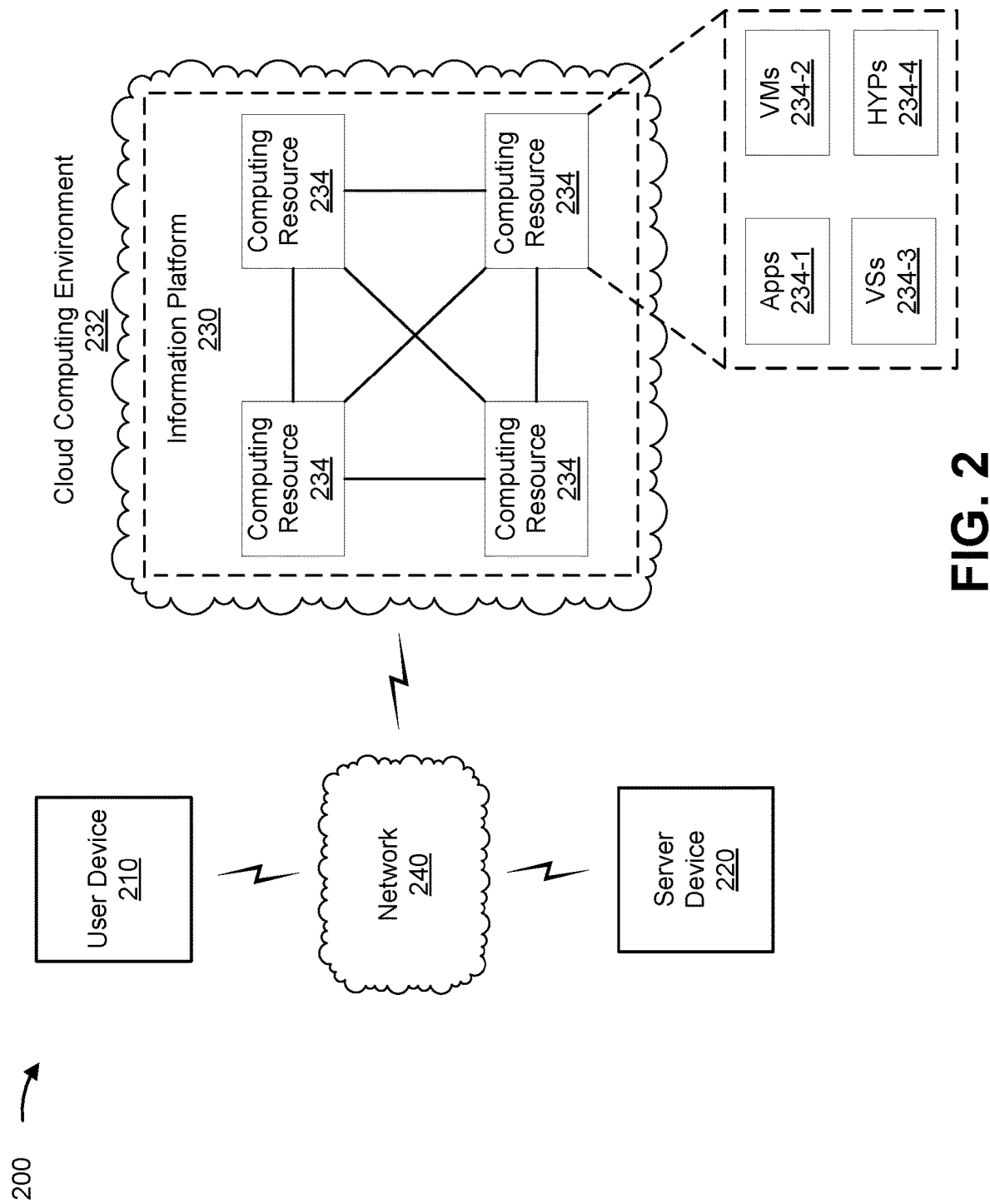
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, server device 220, information platform 230, cloud computing environment 232, and a set of computing resources 234. Devices of environment 200 may interconnect via wired connections, wireless connections, or a combination of wired and wireless connections.

User device 210 includes one or more devices capable of receiving, generating, storing, processing, and/or providing information associated with user queries and responses. For example, user device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), a navigation device (e.g., a global positioning system (GPS) navigation device), or a similar type of device. In some implementations, user device 210 may receive data associated with a user query, as described elsewhere herein. Additionally, or alternatively, user device 210 may provide data associated with the user query to information platform 230, may receive a message from information platform 230 for a user of user device 210 to select a category, topic, and/or intent associated with the query, may obtain a selection from the user of a category, topic, and/or intent associated with the query, may provide data associated with the selection to information platform 230, and may receive a response from information platform 230. Additionally, or alternatively, user device 210 may receive a feedback request message from information platform 230, may obtain feedback from the user, and may provide the feedback to information platform 230.

Server device 220 includes one or more devices capable of receiving, generating, storing, processing, and/or providing information associated with user queries and responses. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may receive information, such as the query, the selection, the response, or identification information, and may store the information. In some implementations, server device 220 may be an identity server for authenticating the identification information. While a single server device 220 is shown in FIG. 2, in practice, there can be hundreds, thousands, millions, etc. of server devices 220 in communication with information platform 230.

Information platform 230 includes one or more devices capable of processing a query for a virtual assistant. For example, information platform 230 may include a cloud server or a group of cloud servers. In some implementations, information platform 230 may be designed to be modular such that certain software components can be swapped in or out depending on a particular need. As such, information platform 230 may be easily and/or quickly reconfigured for different uses. In some implementations, information platform 230 may receive a query from user device 210, may preprocess the query, may call a module to process the query and identify a category, topic, and/or intent associated with the query. In some implementations, information platform 230 may send a message to user device 210 for the user to select the category, topic, and/or intent associated with the query, and may obtain a selection of the category, topic, and/or intent from user device 210. In some implementations, information platform 230 may call a second module based on the selection, to process the query and determine a response, and may send the response to user device 210. In some implementations, information platform 230 may send a feedback request message to user device 210, may receive feedback from user device 210, and may update and/or retrain the first module based on the feedback.

In some implementations, as shown, information platform 230 may be hosted in cloud computing environment 232. Notably, while implementations described herein describe information platform 230 as being hosted in cloud computing environment 232, in some implementations, information platform 230 may not be cloud-based (i.e., may be implemented outside of a cloud computing environment) or may be partially cloud-based.

Cloud computing environment 232 includes an environment that hosts information platform 230. Cloud computing environment 232 may provide computation, software, data access, storage, and/or other services that do not require end-user knowledge of a physical location and configuration of a system and/or a device that hosts information platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host information platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with information platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
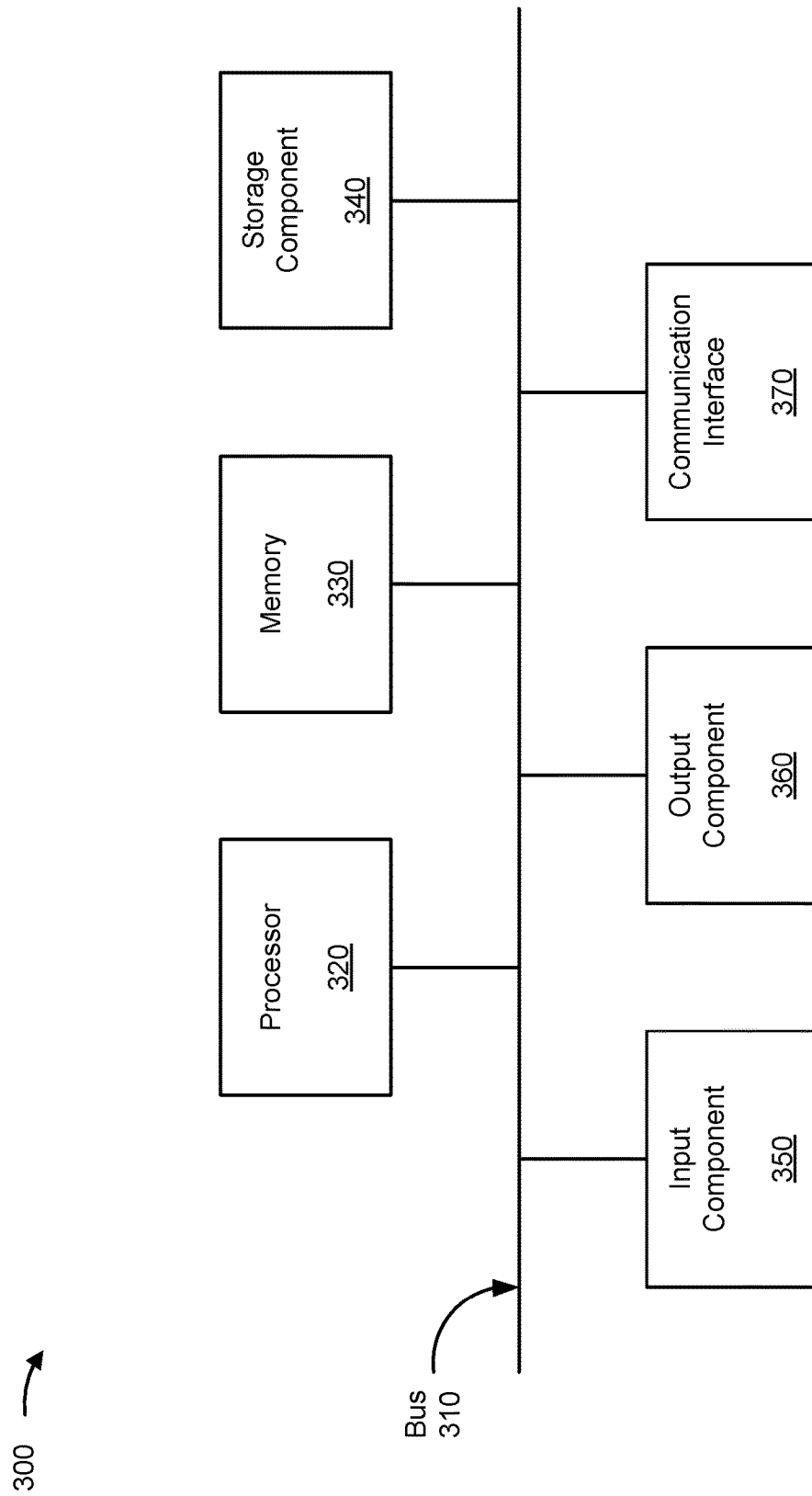
FIG. 3 is a diagram of example components of one or more devices of FIG. 2.

FIG. 3 is a diagram of example components of a device 300. Device 300 may correspond to user device 210, server device 220, information platform 230, and/or computing resource 234. In some implementations, user device 210, server device 220, information platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for an information platform for a virtual assistant. In some implementations, one or more process blocks of FIG. 4 may be performed by an information platform (e.g., information platform 230). In some implementations, one or more process blocks of FIG. 4 may be performed by another device or a group of devices separate from or including the information platform, such as a user device (e.g., user device 210), a server device (e.g., server device 220), and/or the like.

As shown in FIG. 4, process 400 may include receiving a first query from a user device (block 405). For example, the information platform (e.g., using computing resource 234, processor 320, memory 330, storage component 340, input component 350, communication interface 370, and/or the like) may receive a first query from a user device, as described above in connection with FIGS. 1A-1E.

As further shown in FIG. 4, process 400 may include calling a first module to cause the first module to process the first query, wherein the first module uses a machine learning model to parse the first query to determine a first intent of the first query (block 410). For example, the information platform (e.g., using computing resource 234, processor 320, memory 330, storage component 340, communication interface 370, and/or the like) may call a first module to cause the first module to process the first query, as described above in connection with FIGS. 1A-1E. In some implementations, the first module may use a machine learning model to parse the first query to determine a first intent of the first query.

As further shown in FIG. 4, process 400 may include receiving, from the first module, the first intent of the first query (block 415). For example, the information platform (e.g., using computing resource 234, processor 320, memory 330, storage component 340, input component 350, communication interface 370, and/or the like) may receive, from the first module, the first intent of the first query, as described above in connection with FIGS. 1A-1E.

As further shown in FIG. 4, process 400 may include calling, based on the first intent, a second module to cause the second module to process the first query (block 420). For example, the information platform (e.g., using computing resource 234, processor 320, memory 330, storage component 340, communication interface 370, and/or the like) may call, based on the first intent, a second module to cause the second module to process the first query, as described above in connection with FIGS. 1A-1E.

As further shown in FIG. 4, process 400 may include receiving, from the second module, a first response to the first query (block 425). For example, the information platform (e.g., using computing resource 234, processor 320, memory 330, storage component 340, input component 350, communication interface 370, and/or the like) may receive, from the second module, a first response to the first query, as described above in connection with FIGS. 1A-1E.

As further shown in FIG. 4, process 400 may include sending the first response to the user device, wherein sending the first response to the user device causes the user device to display the first response (block 430). For example, the information platform (e.g., using computing resource 234, processor 320, memory 330, storage component 340, output component 360, communication interface 370, and/or the like) may send the first response to the user device, as described above in connection with FIGS. 1A-1E. In some implementations, sending the first response to the user device may cause the user device to display the first response.

As further shown in FIG. 4, process 400 may include receiving a second query from the user device, wherein the second query is related to the first query (block 435). For example, the information platform (e.g., using computing resource 234, processor 320, memory 330, storage component 340, input component 350, communication interface 370, and/or the like) may receive a second query from the user device, as described above in connection with FIGS. 1A-1E. In some implementations, the second query may be related to the first query.

As further shown in FIG. 4, process 400 may include calling the first module to cause the first module to process the second query, wherein the first module uses the machine learning model to parse the second query to determine a second intent of the second query and an indication that the second query is related to the first query (block 440). For example, the information platform (e.g., using computing resource 234, processor 320, memory 330, storage component 340, communication interface 370, and/or the like) may call the first module to cause the first module to process the second query, as described above in connection with FIGS. 1A-1E. In some implementations, the first module may use the machine learning model to parse the second query to determine a second intent of the second query and an indication that the second query is related to the first query.

As further shown in FIG. 4, process 400 may include receiving, from the first module, the second intent of the second query and the indication (block 445). For example, the information platform (e.g., using computing resource 234, processor 320, memory 330, storage component 340, input component 350, communication interface 370, and/or the like) may receive, from the first module, the second intent of the second query and the indication, as described above in connection with FIGS. 1A-1E.

As further shown in FIG. 4, process 400 may include calling, based on the second intent and the indication, the second module to cause the second module to process the second query (block 450). For example, the information platform (e.g., using computing resource 234, processor 320, memory 330, storage component 340, communication interface 370, and/or the like) may call, based on the second intent and the indication, the second module to cause the second module to process the second query, as described above in connection with FIGS. 1A-1E.

As further shown in FIG. 4, process 400 may include receiving, from the second module, a second response to the second query (block 455). For example, the information platform (e.g., using computing resource 234, processor 320, memory 330, storage component 340, input component 350, communication interface 370, and/or the like) may receive, from the second module, a second response to the second query, as described above in connection with FIGS. 1A-1E.

As further shown in FIG. 4, process 400 may include sending the second response to the user device, wherein sending the second response to the user device causes the user device to display the second response (block 460). For example, the information platform (e.g., using computing resource 234, processor 320, memory 330, storage component 340, output component 360, communication interface 370, and/or the like) may send the second response to the user device, as described above in connection with FIGS. 1A-1E. In some implementations, sending the second response to the user device may cause the user device to display the second response.

As further shown in FIG. 4, process 400 may include obtaining first feedback regarding the first response and second feedback regarding the second response from the user device (block 465). For example, the information platform (e.g., using computing resource 234, processor 320, memory 330, storage component 340, input component 350, communication interface 370, and/or the like) may obtain first feedback regarding the first response and second feedback regarding the second response from the user device, as described above in connection with FIGS. 1A-1E.

As further shown in FIG. 4, process 400 may include updating the machine learning model based on the first feedback and the second feedback (block 470). For example, the information platform (e.g., using computing resource 234, processor 320, memory 330, storage component 340, output component 360, communication interface 370, and/or the like) may update the machine learning model based on the first feedback and the second feedback, as described above in connection with FIGS. 1A-1E.

Process 400 may include additional implementations, such as any single implementation or any combination of implementations described below and/or in connection with one or more other processes described elsewhere herein.

In some implementations, the information platform may preprocess the first query after receiving the first query, and may preprocess the second query after receiving the second query. In some implementations, the first module may use a natural language processing machine learning model to process the first query and the second query. In some implementations, the second module may access a universal knowledge base to process the first query. In some implementations, the second module may access a personalized knowledge base to process the second query.

In some implementations, when obtaining the first feedback regarding the first response and the second feedback regarding the second response from the user device, the information platform may send a first message to the user device soliciting a first assessment of the first response, where sending the first message to the user device causes the user device to display the first message, and may send a second message to the user device soliciting a second assessment of the second response, where sending the second message to the user device causes the user device to display the second message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for an information platform for a virtual assistant. In some implementations, one or more process blocks of FIG. 5 may be performed by an information platform (e.g., information platform 230). In some implementations, one or more process blocks of FIG. 5 may be performed by another device or a group of devices separate from or including the information platform, such as a user device (e.g., user device 210), a server device (e.g., server device 220), and/or the like.

As shown in FIG. 5, process 500 may include receiving a query from a user device (block 510). For example, the information platform (e.g., using computing resource 234, processor 320, memory 330, storage component 340, input component 350, communication interface 370, and/or the like) may receive a query from a user device, as described above in connection with FIGS. 1A-1E.

As further shown in FIG. 5, process 500 may include processing the query using a machine learning model to determine one or more categories related to the query (block 520). For example, the information platform (e.g., using computing resource 234, processor 320, memory 330, storage component 340, and/or the like) may process the query using a machine learning model to determine one or more categories related to the query, as described above in connection with FIGS. 1A-1E.

As further shown in FIG. 5, process 500 may include sending a message to the user device, wherein sending the message to the user device causes the user device to display the message, and wherein the message instructs a user of the user device to select a category of the one or more categories (block 530). For example, the information platform (e.g., using computing resource 234, processor 320, memory 330, storage component 340, output component 360, communication interface 370, and/or the like) may send a message to the user device, as described above in connection with FIGS. 1A-1E. In some implementations, sending the message to the user device may cause the user device to display the message. In some implementations, the message may instruct a user of the user device to select a category of the one or more categories.

As further shown in FIG. 5, process 500 may include receiving a selection from the user device, wherein the selection is related to the one or more categories (block 540). For example, the information platform (e.g., using computing resource 234, processor 320, memory 330, storage component 340, input component 350, communication interface 370, and/or the like) may receive a selection from the user device, as described above in connection with FIGS. 1A-1E. In some implementations, the selection may be related to the one or more categories.

As further shown in FIG. 5, process 500 may include calling, based on the selection, a module to cause the module to process the query (block 550). For example, the information platform (e.g., using computing resource 234, processor 320, memory 330, storage component 340, communication interface 370, and/or the like) may call, based on the selection, a module to cause the module to process the query, as described above in connection with FIGS. 1A-1E.

As further shown in FIG. 5, process 500 may include receiving from the module a response to the query (block 560). For example, the information platform (e.g., using computing resource 234, processor 320, memory 330, storage component 340, input component 350, communication interface 370, and/or the like) may receive from the module a response to the query, as described above in connection with FIGS. 1A-1E.

As further shown in FIG. 5, process 500 may include sending the response to the user device, wherein sending the response to the user device causes the user device to display the response (block 570). For example, the information platform (e.g., using computing resource 234, processor 320, memory 330, storage component 340, output component 360, communication interface 370, and/or the like) may send the response to the user device, as described above in connection with FIGS. 1A-1E. In some implementations, sending the response to the user device may cause the user device to display the response.

As further shown in FIG. 5, process 500 may include sending the query, the selection, and the response to one or more servers for storage (block 580). For example, the information platform (e.g., using computing resource 234, processor 320, memory 330, storage component 340, output component 360, communication interface 370, and/or the like) may send the query, the selection, and the response to one or more servers for storage, as described above in connection with FIGS. 1A-1E.

As further shown in FIG. 5, process 500 may include retraining the machine learning model based on information stored by the one or more servers (block 590). For example, the information platform (e.g., using computing resource 234, processor 320, memory 330, storage component 340, communication interface 370, and/or the like) may retrain the machine learning model based on information stored by the one or more servers, as described above in connection with FIGS. 1A-1E.

Process 500 may include additional implementations, such as any single implementation or any combination of implementations described below and/or in connection with one or more other processes described elsewhere herein.

In some implementations, when processing the query using the machine learning model to determine the one or more categories related to the query, the information platform may determine a plurality of categories based on the query, may determine a plurality of confidence scores, for the plurality of categories, which correspond to respective likelihoods that the plurality of categories correctly categorize the query, and may select the one or more categories related to the query based on the plurality of confidence scores.

In some implementations, when selecting the one or more categories related to the query based on the plurality of confidence scores, the information platform may determine, for the one or more categories of the plurality of categories, that corresponding confidence scores, of the plurality of confidence scores, satisfy a threshold, and may select the one or more categories based on the corresponding confidence scores satisfying the threshold.

In some implementations, when selecting the one or more categories related to the query based on the plurality of confidence scores, the information platform may select the one or more categories that have corresponding confidence scores, of the plurality of confidence scores, that satisfy one or more criteria.

In some implementations, when selecting the one or more categories related to the query based on the plurality of confidence scores, the information platform may select the one or more categories that have corresponding confidence scores, of the plurality of confidence scores, that satisfy a first threshold, where a difference between the corresponding confidence scores satisfies a second threshold.

In some implementations, when calling, based on the selection, the module to cause the module to process the query, the information platform may establish a connection with the module via an application programming interface (API). In some implementations, the module may access a static data structure to process the query. In some implementations, the module may access a dynamic data structure to process the query Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for an information platform for a virtual assistant. In some implementations, one or more process blocks of FIG. 6 may be performed by an information platform (e.g., information platform 230). In some implementations, one or more process blocks of FIG. 6 may be performed by another device or a group of devices separate from or including the information platform, such as a user device (e.g., user device 210), a server device (e.g., server device 220), and/or the like.

As shown in FIG. 6, process 600 may include receiving a query from a user device (block 610). For example, the information platform (e.g., using computing resource 234, processor 320, memory 330, storage component 340, input component 350, communication interface 370, and/or the like) may receive a query from a user device, as described above in connection with FIGS. 1A-1E.

As further shown in FIG. 6, process 600 may include processing the query using a machine learning model to determine a set of categories related to the query (block 620). For example, the information platform (e.g., using computing resource 234, processor 320, memory 330, storage component 340, and/or the like) may process the query using a machine learning model to determine a set of categories related to the query, as described above in connection with FIGS. 1A-1E.

As further shown in FIG. 6, process 600 may include sending a message to the user device, wherein sending the message to the user device causes the user device to display the message, and wherein the message instructs a user of the user device to select a category of the set of categories (block 630). For example, the information platform (e.g., using computing resource 234, processor 320, memory 330, storage component 340, output component 360, communication interface 370, and/or the like) may send a message to the user device, as described above in connection with FIGS. 1A-1E. In some implementations, sending the message to the user device may cause the user device to display the message. In some implementations, the message may instruct a user of the user device to select a category of the set of categories.

As further shown in FIG. 6, process 600 may include receiving a selection from the user device, wherein the selection is related to the set of categories (block 640). For example, the information platform (e.g., using computing resource 234, processor 320, memory 330, storage component 340, input component 350, communication interface 370, and/or the like) may receive a selection from the user device, as described above in connection with FIGS. 1A-1E. In some implementations, the selection may be related to the set of categories.

As further shown in FIG. 6, process 600 may include obtaining identification information regarding the user of the user device (block 650). For example, the information platform (e.g., using computing resource 234, processor 320, memory 330, storage component 340, input component 350, communication interface 370, and/or the like) may obtain identification information regarding the user of the user device, as described above in connection with FIGS. 1A-1E.

As further shown in FIG. 6, process 600 may include calling, based on the selection and the identification information, a module to cause the module to process the query (block 660). For example, the information platform (e.g., using computing resource 234, processor 320, memory 330, storage component 340, communication interface 370, and/or the like) may call, based on the selection and the identification information, a module to cause the module to process the query, as described above in connection with FIGS. 1A-1E.

As further shown in FIG. 6, process 600 may include receiving from the module a response to the query (block 670). For example, the information platform (e.g., using computing resource 234, processor 320, memory 330, storage component 340, input component 350, communication interface 370, and/or the like) may receive from the module a response to the query, as described above in connection with FIGS. 1A-1E.

As further shown in FIG. 6, process 600 may include sending the response to the user device, wherein sending the response to the user device causes the user device to display the response (block 680). For example, the information platform (e.g., using computing resource 234, processor 320, memory 330, storage component 340, output component 360, communication interface 370, and/or the like) may send the response to the user device, as described above in connection with FIGS. 1A-1E. In some implementations, sending the response to the user device may cause the user device to display the response.

As further shown in FIG. 6, process 600 may include updating the machine learning model based on the query, the selection, the identification information, and the response (block 690). For example, the information platform (e.g., using computing resource 234, processor 320, memory 330, storage component 340, and/or the like) may update the machine learning model based on the query, the selection, the identification information, and the response, as described above in connection with FIGS. 1A-1E.

Process 600 may include additional implementations, such as any single implementation or any combination of implementations described below and/or in connection with one or more other processes described elsewhere herein.

In some implementations, the identification information may indicate a location of the user, a membership of the user, an employee identifier of the user, a job title of the user, a job role of the user, or a status of the user. In some implementations, when calling, based on the selection and the identification information, the module to cause the module to process the query, the information platform may determine a set of modules from a plurality of modules based on the identification information, and may select the module from the set of modules based on the selection.

In some implementations, the module may process the query based on the identification information. In some implementations, when calling, based on the selection and the identification information, the module to cause the module to process the query, the information platform may establish a connection with the module via an application programming interface (API) based on the identification information. In some implementations, the response may include information related to the identification information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a first query from a user device;
call a first module to cause the first module to process the first query,
wherein the first module uses a machine learning model to parse the first query to determine a first intent of the first query;
receive, from the first module, the first intent of the first query;
call, based on the first intent, a second module to cause the second module to process the first query;
receive, from the second module, a first response to the first query;
send the first response to the user device,
wherein sending the first response to the user device causes the user device to display the first response;
receive a second query from the user device,
wherein the second query is related to the first query;
call the first module to cause the first module to process the second query,
wherein the first module uses the machine learning model to parse the second query to determine a second intent of the second query and an indication that the second query is related to the first query;
receive, from the first module, the second intent of the second query and the indication;
call, based on the second intent and the indication, the second module to cause the second module to process the second query;
receive, from the second module, a second response to the second query;
send the second response to the user device,
wherein sending the second response to the user device causes the user device to display the second response;
obtain first feedback regarding the first response and second feedback regarding the second response from the user device; and update the machine learning model based on the first feedback and the second feedback.

2. The device of claim 1, wherein the one or more processors are further to:
preprocess the first query after receiving the first query; and
preprocess the second query after receiving the second query.

3. The device of claim 1, wherein the first module uses a natural language processing machine learning model to process the first query and the second query.

4. The device of claim 1, wherein the second module accesses a universal knowledge base to process the first query.

5. The device of claim 1, wherein the second module accesses a personalized knowledge base to process the second query.

6. The device of claim 1, wherein the one or more processors, when obtaining the first feedback regarding the first response and the second feedback regarding the second response from the user device, are to:
send a first message to the user device soliciting a first assessment of the first response,
wherein sending the first message to the user device causes the user device to display the first message; and
send a second message to the user device soliciting a second assessment of the second response,
wherein sending the second message to the user device causes the user device to display the second message.

7. A non-transitory computer-readable medium storing instructions, the instructions comprising:
one or more instructions that, when executed by one or more processors of an information platform, cause the one or more processors of the information platform to:
receive a query from a user device;
process the query using a machine learning model to:
determine a plurality of categories based on the query;
determine a plurality of confidence scores, for the plurality of categories, which correspond to respective likelihoods that the plurality of categories correctly categorize the query; and
select one or more categories related to the query that have corresponding confidence scores, of the plurality of confidence scores, that satisfy a first threshold,
wherein a difference between the corresponding confidence scores satisfies a second threshold;
send a message to the user device,
wherein sending the message to the user device causes the user device to display the message,
wherein the message instructs a user of the user device to select a category of the one or more categories;
receive a selection from the user device,
wherein the selection is related to the one or more categories;
call, based on the selection, a module to cause the module to process the query;
receive from the module a response to the query;
send the response to the user device,
wherein sending the response to the user device causes the user device to display the response;
send the query, the selection, and the response to one or more servers for storage; and
retrain the machine learning model based on information stored by the one or more servers.

8. The non-transitory computer-readable medium of claim 7, wherein the corresponding confidence scores further satisfy one or more criteria.

9. The non-transitory computer-readable medium of claim 7, wherein the one or more instructions, that cause the one or more processors of the information platform to call, based on the selection, the module to cause the module to process the query, cause the one or more processors of the information platform to:
establish a connection with the module via an application programming interface (API).

10. The non-transitory computer-readable medium of claim 9, wherein the module accesses a static data structure to process the query.

11. The non-transitory computer-readable medium of claim 9, wherein the module accesses a dynamic data structure to process the query.

12. A method, comprising:
receiving, by an information platform, a query from a user device;
processing, by the information platform, the query using a machine learning model to:
determine a plurality of categories based on the query;
determine a plurality of confidence scores, for the plurality of categories, which correspond to respective likelihoods that the plurality of categories correctly categorize the query; and
select a set of categories related to the query that have corresponding confidence scores, of the plurality of confidence scores, that satisfy a first threshold,
wherein a difference between the corresponding confidence scores satisfies a second threshold;
sending, by the information platform, a message to the user device,
wherein sending the message to the user device causes the user device to display the message,
wherein the message instructs a user of the user device to select a category of the set of categories;
receiving, by the information platform, a selection from the user device,
wherein the selection is related to the set of categories;
obtaining, by the information platform, identification information regarding the user of the user device;
calling, by the information platform and based on the selection and the identification information, a module to cause the module to process the query;
receiving, by the information platform, from the module a response to the query;
sending, by the information platform, the response to the user device,
wherein sending the response to the user device causes the user device to display the response; and
updating the machine learning model based on the query, the selection, the identification information, and the response.

13. The method of claim 12, wherein the identification information indicates a location of the user, a membership of the user, an employee identifier of the user, a job title of the user, a job role of the user, or a status of the user.

14. The method of claim 12, wherein calling, by the information platform and based on the selection and the identification information, the module to cause the module to process the query comprises:
determining a set of modules from a plurality of modules based on the identification information; and selecting the module from the set of modules based on the selection.

15. The method of claim 12, wherein the module is to process the query based on the identification information.

16. The method of claim 12, wherein calling, by the information platform and based on the selection and the identification information, the module to cause the module to process the query comprises:

establishing a connection with the module via an application programming interface (API) based on the identification information.

17. The method of claim 16, wherein the response includes information related to the identification information.

* * * * *